United States Patent
Corbett, Jr.

(10) Patent No.: US 8,056,334 B2
(45) Date of Patent: Nov. 15, 2011

(54) ENERGY RECOVERY METHOD FOR PLASTIC PIPE MANUFACTURING SYSTEMS

(76) Inventor: Bradford G. Corbett, Jr., Fort Worth, TX (US)

(*) Notice: Subject to any disclaimer, the term of this patent is extended or adjusted under 35 U.S.C. 154(b) by 410 days.

(21) Appl. No.: 12/426,017

(22) Filed: Apr. 17, 2009

(65) Prior Publication Data

US 2009/0249778 A1 Oct. 8, 2009

Related U.S. Application Data

(63) Continuation-in-part of application No. 11/472,147, filed on Jun. 21, 2006, now abandoned.

(60) Provisional application No. 60/693,389, filed on Jun. 23, 2005.

(51) Int. Cl.
- F01B 29/08 (2006.01)
- F01B 29/10 (2006.01)
- F01K 25/00 (2006.01)
- A01J 21/00 (2006.01)
- B27N 3/08 (2006.01)

(52) U.S. Cl. ............... 60/516; 60/517; 425/96; 264/239
(58) Field of Classification Search ............. 60/516–526
See application file for complete search history.

(56) References Cited

U.S. PATENT DOCUMENTS

| | | | | |
|---|---|---|---|---|
| 4,455,826 A * | 6/1984 | Knoos | | 60/526 |
| 4,636,085 A * | 1/1987 | Kopernicky | | 366/76.9 |
| 5,718,853 A * | 2/1998 | Ingram | | 264/40.1 |
| 6,755,640 B2 * | 6/2004 | Bauer et al. | | 425/551 |
| 7,284,372 B2 * | 10/2007 | Crow | | 60/519 |

* cited by examiner

*Primary Examiner* — Thomas Denion
*Assistant Examiner* — Christopher Jetton
(74) *Attorney, Agent, or Firm* — Charles D. Gunter, Jr.

(57) ABSTRACT

An energy recovery system for a pipe manufacturing process is shown. A compression or injection molding operation is used to form a sealing gasket which is used in the subsequent pipe manufacturing operation. A Stirling engine cycle is used to recover heat during the gasket manufacture. The Stirling engine is driven by waste heat from the mold members or other associated parts of the injection or compression molding apparatus. The recovered waste heat is used to subsequently heat the female pipe end which is being belled in the pipe manufacturing process.

10 Claims, 6 Drawing Sheets

ENERGY RECOVERY METHOD FOR PLASTIC PIPE MANUFACTURING SYSTEMS

CROSS REFERENCE TO RELATED APPLICATIONS

The present application is a continuation-in-part of prior filed Ser. No. 11/472,147, filed Jun. 21, 2006, now abandoned entitled "Energy Recovery System For Rubber and Plastic Molding Machines", by the same inventor, which claimed priority from provisional application Ser. No. 60/693,389, filed Jun. 23, 2005, entitled "Energy Recovery System for Rubber and Plastic Molding Machines," and invented by Bradford G. Corbett, Jr.

BACKGROUND OF THE INVENTION

1. Field of the Invention

The present invention relates generally to the manufacture of plastic pipe of the type used in municipal water and sewer systems, more specifically, to the injection and compression molding processes used to form the sealing gaskets which are installed in such systems, and to a process for recovering and further utilizing waste energy from such processes.

2. Description of the Prior Art

An almost unlimited variety of articles are produced from rubber, synthetic elastomers and plastics using compression and injection molding equipment. As one example, many kinds of equipment, ducting, piping, castings, and other parts are joined together in gasketed joints in order to form gas, liquid, electrical, chemical, or sound isolation seals at the joints.

For example, a variety of piping systems are known for the conveyance of fluids which employ elastomeric type sealing rings or gaskets. The pipes used in such systems may be formed of PVC, polyolefins such as PE and PP, ductile iron, concrete, clay, fiberglass, steel, cast iron, fiberglass/cement reinforced pipes and such metals as aluminum and copper. Pipes formed from thermoplastic materials including polyethylene and PVC are used in a variety of industries but are particularly useful in municipal water and sewage systems. It is well known in the art to extrude such plastic pipes in an elongated cylindrical configuration of a desired diameter and to then cut the extruded product into individual lengths of convenient size suitable for handling, shipping and installing. Each length of pipe is enlarged or "belled" at one end sufficiently to join the next adjacent pipe section by receiving in the female, belled end the unenlarged or "spigot" male end of the next adjacent length of pipe. The inside diameter of the bell is formed sufficiently large to receive the spigot end of the next section of pipe with sufficient clearance to allow the application of packing, caulking, elastomeric gaskets or other sealing devices designed to prevent leakage at pipe joints when a plurality of pipe lengths are joined to form a pipeline.

In the early 1970's, a new sealing gasket technology for PVC pipes was developed by Rieber & Son of Bergen, Norway, referred to in the industry as the "Rieber Joint." The Rieber system provided an integral sealing mechanism within the belled or female pipe end for sealing with the spigot end of a mating pipe formed from thermoplastic material. In the Rieber process, the elastomeric gasket was inserted within an internal groove in the socket end of the female pipe as the female or belled end was simultaneously being formed. The provision of a prestressed and anchored elastomeric gasket during the belling process at the pipe factory provided an improved socket end for a pipe joint with a sealing gasket which would not twist or flip or otherwise allow impurities to enter the sealing zones of the joint, thus increasing the reliability of the joint and decreasing the risk of leaks or possible failure due to abrasion. The Rieber process is described in the following issued United States patents, among others: U.S. Pat. Nos. 4,120,521; 4,061,459; 4,030,872; 3,965,715; 3,929,958; 3,887,992; 3,884,612; and 3,776,682.

The elastomeric rings or gaskets used in the above type of sealing applications are typically formed from natural or synthetic rubbers or synthetic elastomers in compression or injection molding machines. Either type of molding machine produces excess, waste heat in the manufacturing environment. Heat is also utilized in the Rieber pipe manufacturing process where the female pipe end is heated and forced over the forming mandrel and sealing gasket to form the belled pipe end. Despite the many advances which have occurred in injection and compression molding technologies, and in plastic pipe manufacturing techniques, a need exists to continue to improve the manufacturing efficiency and economy in such processes. A specific area in which the overall efficiency and economy of the processes can be improved is in the area of energy utilization and recovery.

Both profits and environmental quality can be improved by more carefully using energy in industrial processes such as the compression and injection molding processes and plastic pipe manufacturing processes described. Discharging any heated fluid (air, water, etc.) into the environment is a waste of money and resources. Hot waste streams are paid for with money that could have been profit. Energy has always been a significant component of industrial operations, but only rarely has efficient energy use been a priority when factories were being expanded. As long as a factory or product line was profitable, very little attention was usually paid to efficient energy use. Today, however, increasing attention is being focused on maximizing energy use and minimizing pollution in the modern industrial setting.

SUMMARY OF THE INVENTION

The present invention has as its object to make more efficient use of what would otherwise be waste heat in the manufacturing environment of a specific type of industrial process, namely a plastic pipe manufacturing process of the type which utilizes a sealing gasket formed by either compression or injection molding techniques.

The present method utilizes a Stirling engine thermodynamic cycle in order to utilize the waste heat which is generated in an injection or compression molding operation. The recovered waste heat is then employed in a Rieber type plastic pipe manufacturing process. In the case of a compression molding process, a molding material is placed in a cavity having a predetermined shape, the cavity being formed between a fixed mold member and a movable mold member. The molding material is a natural or synthetic rubber or any one of a number of synthetic elastomers. Pressure is applied between the respective fixed and movable mold members to cause the mold material to conform to the shape of the mold cavity. In the method of the invention, Stirling engine is positioned in proximity to the fixed and movable mold members, the Stirling engine having a heating cycle and a cooling cycle which alternately heat and cool a fixed volume of compressible gas. The natural heating changes which occur in the operation of the molding process are used to power the Stirling engine.

In one embodiment of the invention, the Stirling engine has a first and second cylinders, the first cylinder being heated by an external heat source associated with the molding process and the second cylinder being cooled by an external cooling source. In one embodiment of the invention, the mold cavity is in a shape which is suitable for forming a sealing gasket when the fixed and movable mold members are brought into contact.

In another embodiment of the invention, a Stirling engine is used to recover energy in an injection molding process. In the injection molding process, a molding material is fed from a hopper into a working chamber where it is softened by heat in a heated region and then forced into a mold of a desired shape where it is cooled and solidified in a cooling region. As previously described, a Stirling engine is placed in proximity to the injection molding apparatus which is being used to form a pipe sealing gasket. The Stirling engine has a heating cycle and a cooling cycle which alternately heat and cool a fixed volume of compressible gas.

In either case, the energy so recovered is then further utilized in a plastic pipe manufacturing process of the type which uses the injection or compression molded sealing gaskets previously formed. The method of the invention uses heating changes which occur as a result of operation of the molding process to power the Stirling engine. The Stirling engine is then used in a Rieber style pipe manufacturing process where a sealing gasket is placed on a forming mandrel and a female pipe end is heated and the forced over the forming mandrel to form a belled pipe end.

Additional objects, features and advantages will be apparent in the written description which follows.

DETAILED DESCRIPTION OF THE INVENTION

The present invention involves the use of s Stirling engine or Stirling cycle in recovering heat from an injection molding or compression molding process, the recovery heat then be utilized in a subsequent plastic pipe manufacturing process to improve the efficiency of the process. Since Stirling engines can run on any heat source, they can be used to recover power from industrial waste heat sources such as those found in compression and injection molding industries. Stirling cycle machines, including engines and refrigerators, are well known in the art. Many technical articles and treatises have been written on the subject. For example, see the text by G. Walker, "Stirling Engines", Clarendon Press, Oxford, 1980, ISBN No. 0-19-856209-8, which is considered by many to be a standard reference in the field.

Briefly stated, the principle underlying the Stirling cycle engine is the mechanical realization of the Stirling thermodynamic cycle: isovolumetric heating of a gas within a cylinder, isothermal expansion of the gas (during which work is performed by driving a piston), isovolumetric cooling, and isothermal compression. The Stirling cycle refrigerator is also the mechanical realization of a thermodynamic cycle which approximates the ideal Stirling thermodynamic cycle. In an ideal Stirling thermodynamic cycle, the working fluid undergoes successive cycles of isovolumetric heating, isothermal expansion, isovolumetric cooling and isothermal compression. Practical realizations of the cycle, wherein the stages are neither isovolumetric nor isothermal, are intended to be within the scope of the present invention, as will be described in the examples which follow.

In more practical terms, every Stirling engine has a sealed cylinder with one part hot and the other cold. The working gas inside the engine (which is often air, helium, or hydrogen) is moved by a mechanism from the hot side to the cold side. When the gas is on the hot side it expands and pushes up on a piston. When it moves back to the cold side it contracts. Properly designed Stirling engines have two power pulses per revolution, which can make them very smooth running. Two of the more common types are two piston Stirling engines and displacer-type Stirling engines. The two piston type Stirling engine has two power pistons. The displacer type Stirling engine has one power piston and a displacer piston.

Figure 1A:
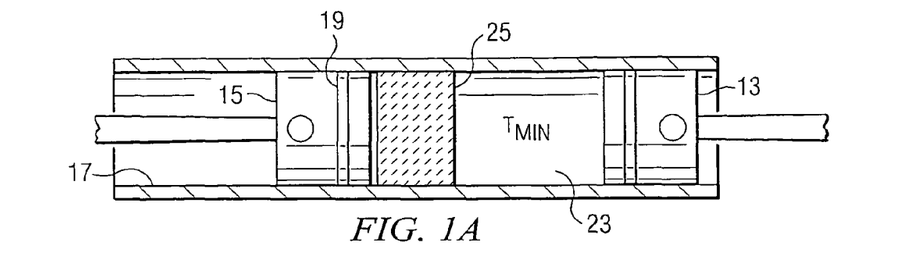
FIGS. 1A-1D depict the principle of operation of a prior art Stirling cycle machine.

Turning now to FIGS. 1A-1D of the drawings, the principle of operation of a Stirling cycle engine is described. It will be understood by those skilled in the art, however, that many mechanical versions of the Stirling cycle engines are known in the art, and the particular Stirling cycle illustrated in the Figures is shown merely for illustrative purposes. In FIGS. 1A to 1D, a piston 13 (otherwise referred to herein as a "compression piston") and a second piston (also known as an "expansion piston") 15 move in phased reciprocating motion within cylinder 17. Compression piston 13 and expansion piston 15 may also move within separate, interconnected, cylinders. Piston seals 19 prevents the flow of a working fluid contained within cylinder 17 between piston 13 and piston 15 from escaping around either piston. The working fluid is chosen for its thermodynamic properties, and can be, for example, helium at a pressure of several atmospheres. The volume of fluid governed by the position of expansion piston 15 is referred to as expansion space (21 in FIG. 1D). The volume of fluid governed by the position of compression piston 13 is referred to as compression space 23 (FIG. 1A). In order for fluid to flow between expansion space 21 and compression space 23, the fluid passes through regenerator 25. In the particular embodiment of the invention illustrated, the regenerator 25 is a matrix of material having a large ratio of surface area to volume which serves to absorb heat from the working fluid when the fluid enters hot from expansion space 21 and to heat the fluid when it passes from compression space 23 returning to expansion space 21.

Figure 1B:
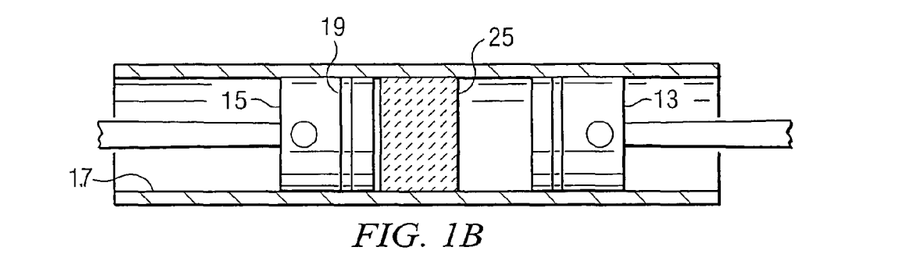
Figure 1C:
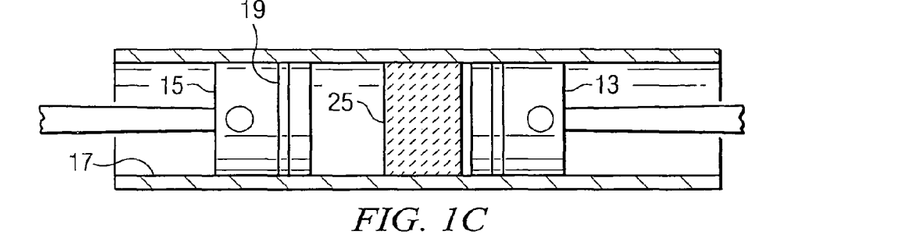

During the first phase of the engine cycle, the starting condition of which is depicted in FIG. 1A, piston 13 compresses the fluid in compression space 23. The compression occurs at a constant temperature because heat is extracted from the fluid to the ambient environment. In practice, a cooler is typically provided, as will be discussed in the description below. The condition of the engine after compression is depicted in FIG. 1B. During the second phase of the cycle, expansion piston 15 moves in synchrony with compression piston 13 to maintain a constant volume of fluid. As the fluid is transferred to expansion space 21, it flows through regenerator 25 and acquires heat from regenerator 25 such that the pressure of the fluid increases. At the end of the transfer phase, the fluid is at a higher pressure and is contained within expansion space 21, as depicted in FIG. 1C.

Figure 1D:
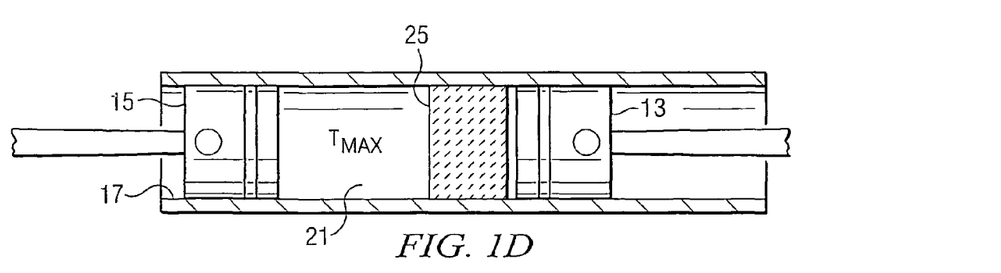
Figure 2:
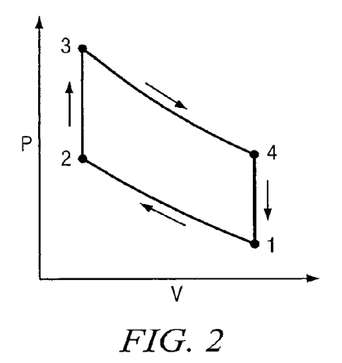
FIG. 2 is a pressure-volume diagram of the Stirling cycle shown in FIGS. 1A-1D.
Figure 3:
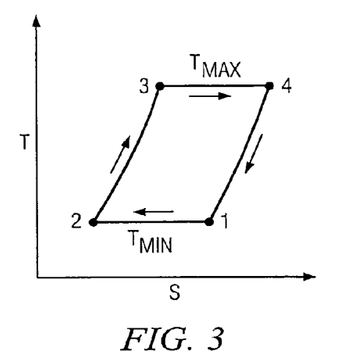
FIG. 3 is a temperature-entropy diagram of the Stirling cycle shown in FIGS. 1A-1D.
Figure 4A:
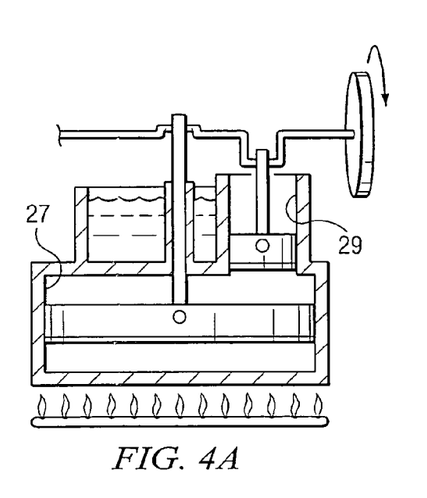
FIGS. 4A-4D are simplified, schematic illustrations of a Stirling cycle which is used to recover energy and convert the energy to mechanical work.
Figure 4B:
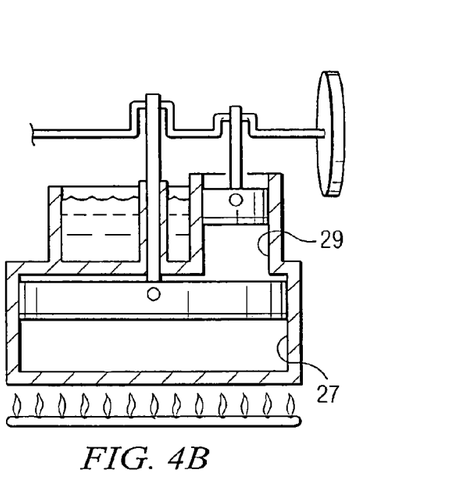
Figure 4C:
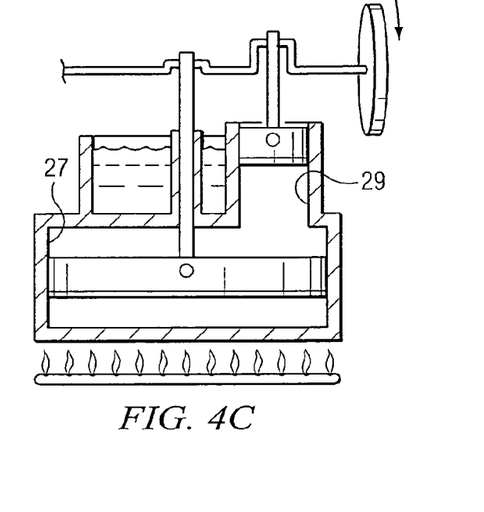
Figure 4D:
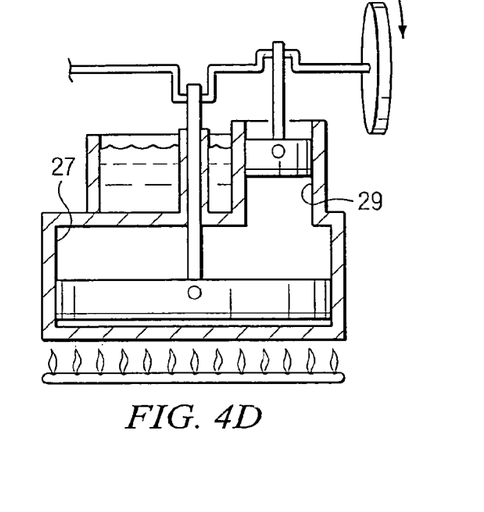

During the third (expansion) phase of the engine cycle, the volume of expansion space 21 increases as heat is drawn in from outside the engine, thereby converting heat to work. In practice, heat is provided to the fluid in expansion space 21 by means of a heater 64, as will be further described. At the end of the expansion phase, the hot fluid fills the full expansion space 21 as depicted in FIG. 1D. During the fourth phase of the engine cycle, the fluid is transferred from expansion space 21 to compression space 23, heating regenerator 25 as the fluid passes through it. At the end of the second transfer phase, the fluid is in compression space 23, as depicted in FIG. 1A, and is ready for a repetition of the compression phase. The Stirling cycle is depicted in a P-V (pressure-volume) diagram as shown in FIG. 2 and in a T-S (temperature-entropy) diagram as shown in FIG. 3. The Stirling cycle is a closed cycle in that the working fluid is typically not replaced during the course of the cycle.

The principle of operation of a Stirling cycle refrigerator can also be described with reference to FIGS. 1A-1D, wherein identical numerals are used to identify the same or similar parts. The differences between the engine described above and a Stirling machine employed as a refrigerator are that compression volume 21 is typically in thermal communication with ambient temperature and expansion volume 23 is connected to an external cooling load (not shown).

One key characteristic of the Stirling engine is that a fixed amount of a gas is sealed inside the engine. The Stirling cycle involves a series of events that change the pressure of the gas inside the engine, causing it to do work. There are several properties of gasses that are critical to the operation of Stirling engines: (1) if you have a fixed amount of gas in a fixed volume of space and you raise the temperature of that gas, the pressure will increase; (2) if you have a fixed amount of gas and you compress it (decrease the volume of its space), the temperature of that gas will increase.

Referring now to the simplified depiction of a Stirling cycle in FIGS. 4A-4D of the drawings, each part of the Stirling cycle will be described while looking at a simplified Stirling engine. In this case, the simplified engine uses two cylinders shown generally as 27 and 29 in FIG. 4A. One cylinder is heated by an external heat source (by means of example, such as by fire), and the other is cooled by an external cooling source (by means of example, such as by ice). The gas chambers of the two cylinders are connected, and the pistons are connected to each other mechanically by a linkage that determines how they will move in relation to one another There are basically four parts to the Stirling cycle as illustrated in FIGS. 4A-4D. The two pistons 27, 29 accomplish the parts of the cycle in the following manner. Heat is added to the gas inside the heated cylinder 27, causing pressure to build. This forces the piston to move down. This is the part of the Stirling cycle that is used to accomplish work. The left piston 27 moves up while the right piston 29 moves down. This pushes the hot gas into the cooled cylinder, which quickly cools the gas to the temperature of the cooling source, lowering its pressure. It is then easier to compress the gas in the next part of the cycle.

The piston in the cooled cylinder 29 starts to compress the gas. Heat generated by this compression is removed by the cooling source. The right piston 29 moves up while the left piston 27 moves down. This forces the gas into the heated cylinder, where it quickly heats up, building pressure, at which point the cycle repeats.

The above discussion described the ideal Stirling cycle. Actual working engines vary the cycle slightly because of the physical limitations of their design.

Figure 5A:
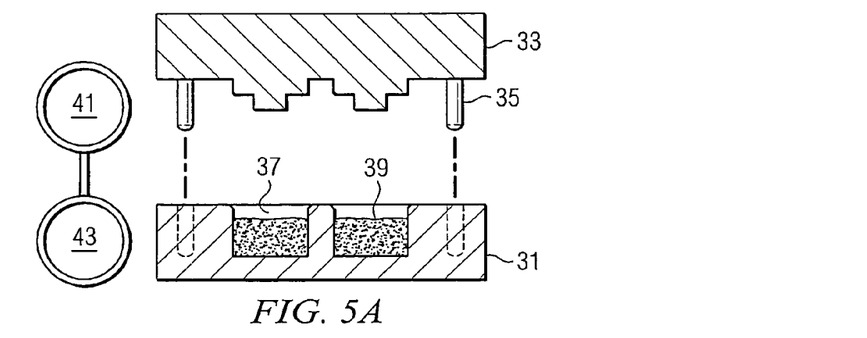
FIGS. 5A-5B are simplified illustrations of the steps involved in a compression molding process in which a Stirling engine is used to recover energy from the process.
Figure 5B:
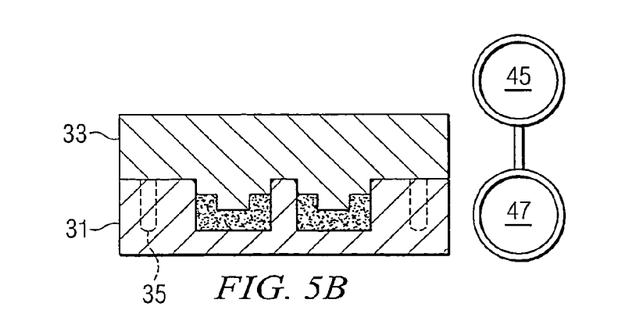

Turning now to FIGS. 5A and 5B, a compression molding machine is illustrated in simplified, schematic fashion. The device shown in FIG. 5A includes a fixed mold element 31 and a movable mold element 33. The mold elements are moved in reciprocal fashion, as illustrated in FIGS. 5A and 5B by means of a prime mover (illustrated schematically as 35 in FIGS. 5A and 5B). In this case, the lower, fixed mold element 31 has a mold cavity 37 which contains a molding material 39 such as a suitable natural or synthetic rubber or other suitable synthetic elastomer. The cavity 37 has a predetermined shape, such as that of a sealing ring or gasket. As shown in FIGS. 5A and 5B, pressure is applied between the respective fixed and movable mold members to cause the mold material 37 to conform to the shape of the mold cavity.

In the embodiment of the invention illustrated in FIGS. 5A and 5B, the working ends or chambers 41, 43 and 45, 47, respectively, are positioned proximate the fixed and movable mold members 31, 33. The Stirling engine has a heating cycle and a cooling cycle which alternately heats and cools a fixed volume of compressible gas, as previously described. The method of the invention thus uses the heating changes which occur as a result of operation of the molding process to power the Stirling engine.

Figure 6:
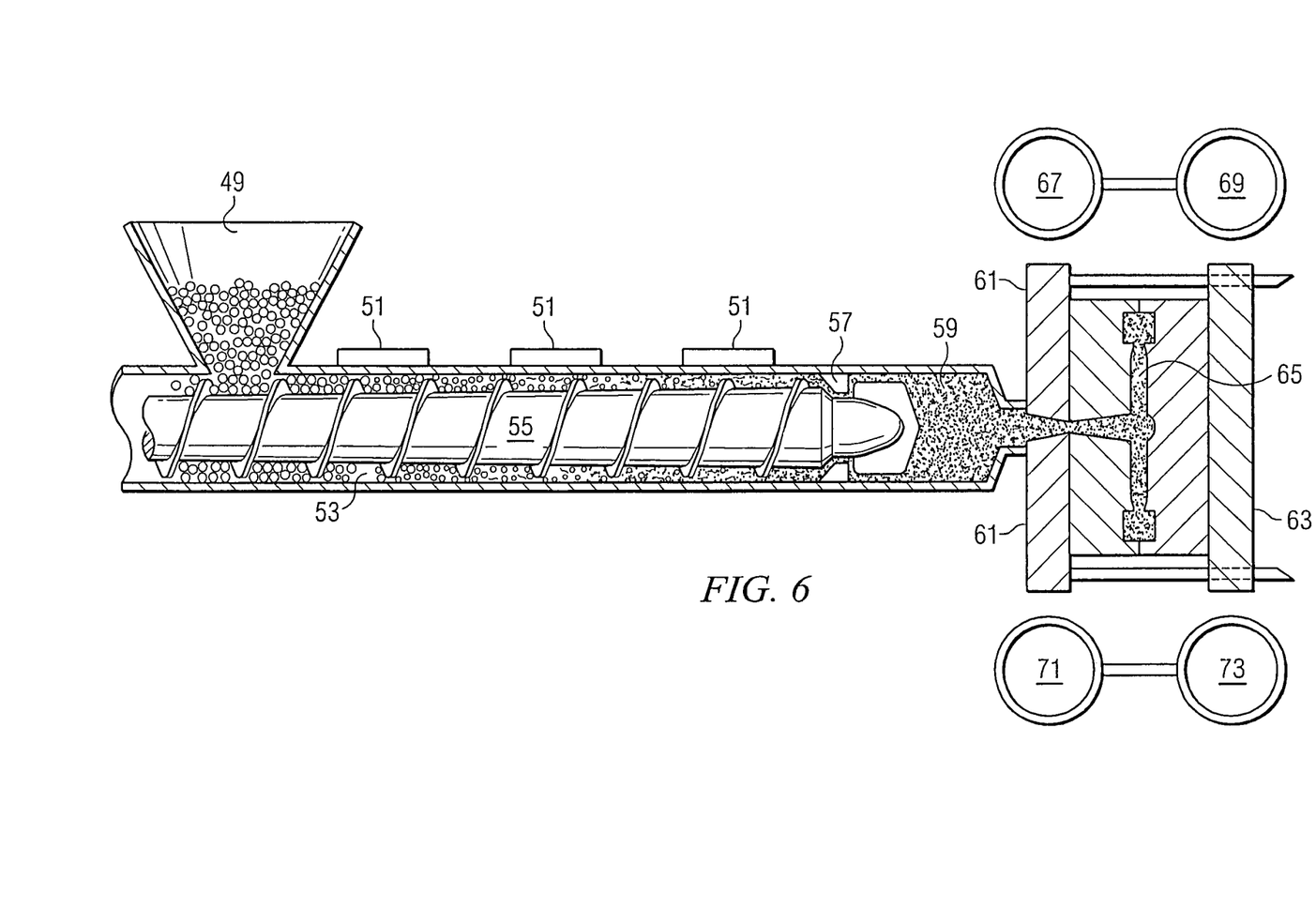
FIG. 6 is a simplified view of an injection molding apparatus with a Stirling engine being used to recover energy from the process.

FIG. 6 illustrates the principles of the invention in the case of an injection molding operation. In the injection molding operation illustrated in FIG. 6, polymer granules are fed to a hopper 49. In the particular embodiment illustrated, electric heaters 51 surround the working chamber 53 in which is located a screw of decreasing channel depth 55. The screw 55 acts as a melting plasticizer and ram for injecting the heated polymer. A check valve 57 prevents backflow during the injection operation. A reservoir of the melt 59 is thereby accumulated for each "shot" of injected plastic. The injection molding apparatus further includes a fixed platen 61 and a movable platen 63. The fixed and movable platens 61, 63 define a mold region 65 of a desired shape where the injected plastic is cooled and solidified in a cooling region.

As shown in FIG. 6, a Stirling engine having regions or chambers 67, 69 and 71, 73 is located in proximity to the platens 61, 63 used in the injection molding process. The Stirling engine has a heating cycle and a cooling cycle which alternately heats and cools a fixed volume of compressible gas. The method of the invention uses heating changes which occur as a result of operation of the molding process to power the Stirling engine. Note that the Stirling engine may or may not be physically coupled to a selected one of the fixed and movable platens. In certain molding operations, the mold members will heat up in the range of 500 degrees F., or above, Thus, in some embodiments of the invention, the components are physically separated from the platens with heat exchange being by convection through the surrounding air. In other embodiments, one or the other of the platens is placed in contact with the Stirling engine with heat exchange being effected by conduction through connecting surfaces.

The excess heat energy generated in the sealing gasket molding process is then used within the same physical manufacturing plant in a Reiber style plastic pipe manufacturing process. In order to explain the use of the recovered energy in the system of the present invention, it is necessary to briefly explain the prior art "Rieber" process for plastic pipe manufacture that was briefly described in the Background of the Invention. As previously described, in the Rieber process, the elastomeric gasket was installed within a simultaneously formed internal groove in the socket end of the female pipe during the pipe belling process. The provision of a prestressed and anchored elastomeric gasket during the belling process at the pipe factory provided an improved socket end for a pipe joint with a sealing gasket which would not twist or flip or otherwise allow impurities to enter the sealing zones of the joint, thus increasing the reliability of the joint and decreasing the risk of leaks or possible failure due to abrasion.

Figure 7:
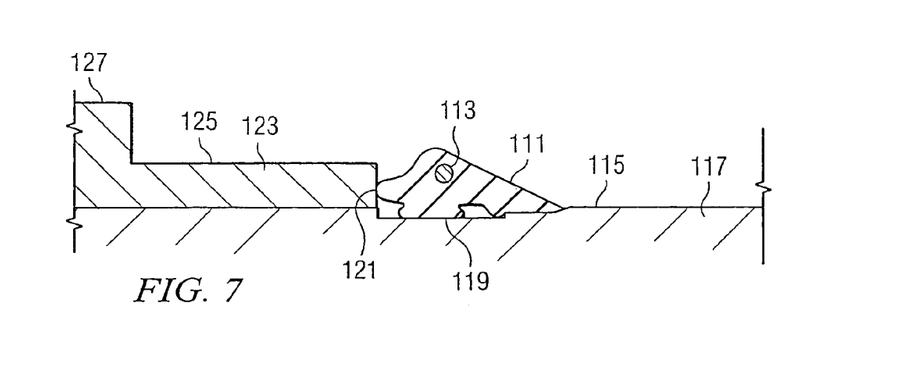
FIGS. 7-10 are simplified, schematic views of a Rieber style plastic pipe manufacturing process which has been modified according to the energy recovery and utilization processes of the invention.

The relevance of the Rieber process to Applicant's invention can perhaps best be appreciated with reference to the description of the schematic description of the process shown in FIGS. 7-10. FIG. 7 shows a section of a conventional elastomeric sealing gasket 111 having a steel reinforcing ring 113 in place on the generally cylindrical outer working surface 115 of a forming mandrel 117 used in the belling process. The elastomeric gasket 111 can be formed of, for example, SBR rubber and is a ring shaped, circumferential member having an inner compression surface 119 and an exposed nose portion 121 which, as shown in FIG. 6, abuts a forming collar 123. The forming collar 123 has a first generally cylindrical extent 125 which is joined to a second cylindrical extent 127 by a step region 129, whereby the second extent 127 is of greater external diameter than the first cylindrical extent 125, shown in FIG. 7.

In the first step of the prior art process, the steel reinforced elastomeric ring 111 is thus placed onto the working surface of the mandrel 117 and pushed to a position against the back-up or forming collar 123. In this position, the gasket is firmly anchored to the mandrel surface with the rubber between the mandrel and the steel-ring of the gasket being compressed by approximately 20%.

Figure 8:
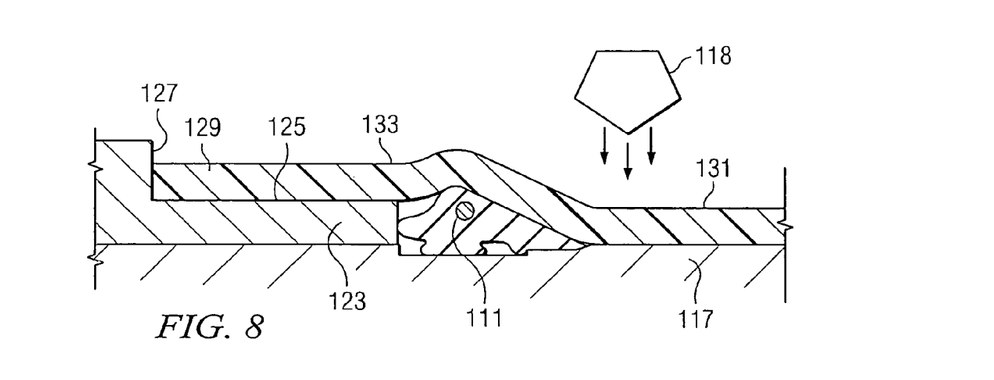
Figure 9:
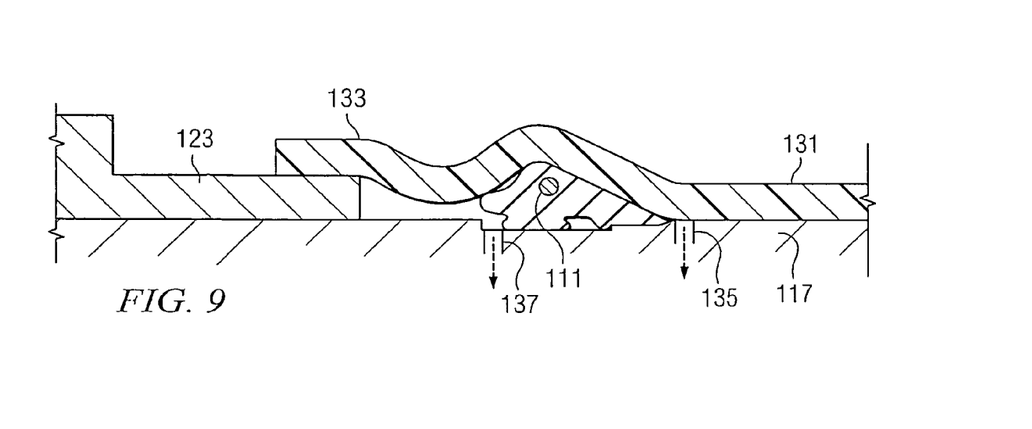
Figure 10:
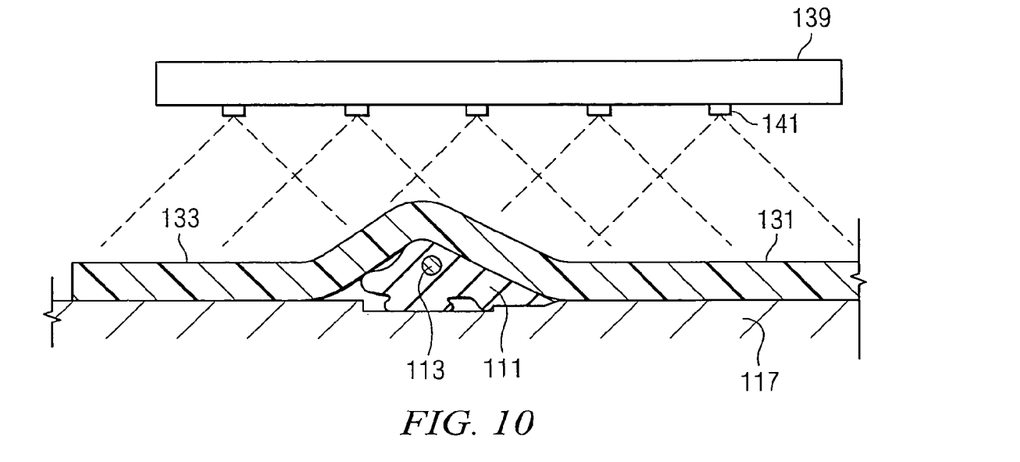

In the second step of the prior art process shown in FIG. 8, the socket end 133 of the thermoplastic pipe 131 is heated and pushed over the steel mandrel 117, gasket 11 and back-up collar 123. This conventional heating step is modified according to the principles of the present invention by supplying heat (illustrated schematically by the heating element 118 in FIG. 8) which has been recovered at least in part from the use of the Stirling engine as discussed above. Continuing with FIG. 8, the socket end 133 is expanded due to the thermoplastic nature of the pipe. A number of thermoplastic materials, such as polyethylene, polypropylene and polyvinylchloride (PVC) are known in the prior art having the required expansion characteristics, depending upon the end application of the pipe joint. However, the preferred material for this application is PVC due to its expansion and contraction characteristics. The socket end 133 flows over the first cylindrical extent 125 of the back-up collar 123 and abuts the step region 129 in the second step of the process. Note that the pipe end is deformed by the presence of the gasket 11 so that a gasket receiving groove is formed with the pipe I.D.

In the next step of the prior art process (FIG. 9) the mandrel and pipe move away from the back-up collar 123 and the pipe socket end 133 retracts around the mandrel and gasket 111 due to the elastic forces of the thermoplastic material. Typically, vacuum was also applied through ports 135, 137 which connected the mandrel working surface with a vacuum source (not shown). In the final step of the prior art process shown in FIG. 10, the pipe socket end 133 is cooled by means of a water spray bar 139 and spray nozzles 141. As the cooling takes place, the pipe socket end 133 shrinks around the gasket 111, thus compressing the rubber body of the gasket between the steel reinforcing ring 113 and the socket-groove to establish a firm seal. The above described Rieber process has been in commercial use since the early 1970's and is described in the above referenced issued United States patents, among other sources. It will thus be well familiar to those skilled in the thermoplastic pipe sealing arts. The use of the Stirling engine to provide energy for the heating step in the pipe manufacturing process is not known in the prior art, however.

Figure 11:
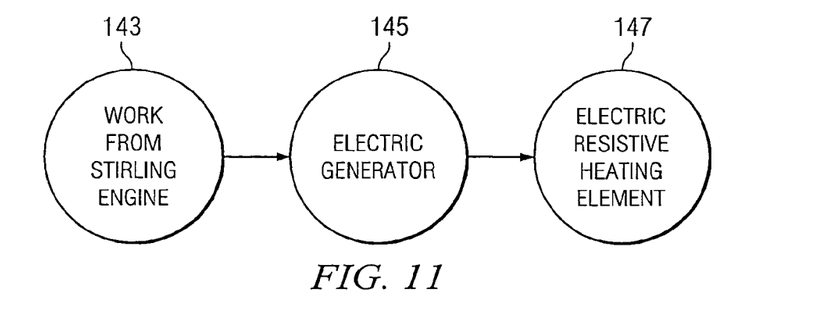
FIG. 11 is a block diagram of one form of the energy recovery system of the invention.

The block diagram illustrated as FIG. 11 of the drawings is intended to represent the use of the heat energy which has been recovered by the Stirling engine in supplying the heat necessary to soften the female pipe end in the Rieber manufacturing process, previously described. Thus, in a step 143, the work obtained from the Stirling engine is used to drive an electric generator 145. The electricity generated in the step 145 is then used to power an electric resistive heating element in a final step 147. This electric resistive heating element may take the form, for example, of a circular ring or chamber through which the female pipe end is fed. This illustrated example is intended to merely be illustrative of the use of the Stirling engine to recover useful work which can, in turn, be used to provide heat to an existing pipe manufacturing process. The exact heating element could take other forms, however, such as an infrared heating element.

An invention has been provided with several advantages. The energy recovery system of the invention utilizes the cycle of a Stirling engine to effectively recover energy from an injection or compression molding operation. The energy which is recovered can be used to power the injection or compression molding operation or parts thereof, or can be utilized in another part of the manufacturing plant. In one form of the process of the invention, the excess heat energy which is recovered in the molding or injection step of the process is used to heat the female pipe end which is used in a later step in the pipe manufacturing process to manufacture a pipe having a Rieber sealing gasket installed therein. It is not necessary to physically connect the Stirling engine to the components of the injection or compression molding apparatus, since heat transfer to the Stirling engine can be accomplished by convection. As a result, extensive changes to the existing equipment in the plant is not required.

While the invention has been shown in only one of its forms, it is not thus limited but is susceptible to various changes and modifications without departing from the spirit thereof.

What is claimed is:

1. A method of recovering energy in a plastic pipe manufacturing process utilizing a sealing gasket compression molding process in which a gasket molding material is placed in a cavity having a predetermined shape, the cavity being formed between a fixed mold member and a movable mold member, pressure being applied between the respective fixed and movable mold members to cause the gasket molding material to conform to the shape of the mold cavity, the method comprising the steps of:

positioning a Stirling engine in proximity to the fixed and movable mold members, the Stirling engine having a heating cycle and a cooling cycle which alternately heat and cool a fixed volume of compressible gas;

using heating changes which occur as a result of operation of the molding process to power the Stirling engine;

providing a forming mandrel having an inner end and an outer end and having an outer working surface;

locating a pipe sealing gasket formed in the compression molding process at a first circumferential position on the outer working surface of the mandrel;

forming a belled pipe end about the sealing gasket by first heating a female end of the plastic pipe using the heat recovered by the Stirling engine and then forcing the heated female pipe end over the outer working surface of the mandrel and over the sealing ring, whereby the heated female end of the plastic pipe flows over the sealing ring to form a retention groove for the sealing gasket within the female pipe end;

thereafter cooling the female pipe end to form a female, belled pipe end followed by retracting the belled pipe end with its retained sealing gasket from the working surface of the mandrel.

2. The method of claim 1, wherein the Stirling engine has a first and second cylinders, the first cylinder being heated by an external heat source associated with the molding process and the second cylinder being cooled by an external cooling source.

3. The method of claim 2, wherein each cylinder has a gas chamber, the gas chambers being interconnected by means of a mechanical linkage.

4. The method of claim 1, wherein the molding material is selected from the group consisting of natural and synthetic rubbers and synthetic elastomers.

5. The method of claim 1, wherein the mold cavity is in the shaped to form a sealing gasket having a ring shaped body when the fixed and movable mold members are brought into contact.

6. A method of recovering energy in a plastic pipe manufacturing process utilizing a sealing gasket formed in an injection molding process in which a gasket molding material is fed from a hopper into a cylinder where it is softened by heat in a heated region and then forced into a mold of a desired shape where it is cooled and solidified in a cooling region, the method comprising the steps of:

positioning a Stirling engine in proximity to the injection molding process, the Stirling engine having a heating cycle and a cooling cycle which alternately heat and cool a fixed volume of compressible gas;

using heating changes which occur as a result of operation of the molding process to power the Stirling engine;

providing a forming mandrel having an inner end and an outer end and having an outer working surface;

locating a pipe sealing gasket formed in the injection molding process at a first circumferential position on the outer working surface of the mandrel;

forming a belled pipe end about the sealing gasket by first heating a female end of the plastic pipe using the heat recovered by the Stirling engine and then forcing the heated female pipe end over the outer working surface of the mandrel and over the sealing ring, whereby the heated female end of the plastic pipe flows over the sealing ring to form a retention groove for the sealing gasket within the female pipe end;

thereafter cooling the female pipe end to form a female, belled pipe end followed by retracting the belled pipe end with its retained sealing gasket from the working surface of the mandrel.

7. The method of claim 6, wherein the Stirling engine has a first and second cylinders, the first cylinder being heated by an external heat source associated with the molding process and the second cylinder being cooled by an external cooling source.

8. The method of claim 7, wherein each cylinder has a gas chamber, the gas chambers being interconnected by means of a mechanical linkage.

9. The method of claim 6, wherein the molding material is selected from the group consisting of natural and synthetic rubbers and synthetic elastomers.

10. The method of claim 6, wherein the mold cavity is in the shaped to form a sealing gasket having a ring shaped body when the fixed and movable mold members are brought into contact.

* * * * *